United States Patent

[11] 3,581,467

| [72] | Inventor | Frank M. Donnelly<br>5773 Belmont Ave., Cincinnati, Ohio 45224 |
|---|---|---|
| [21] | Appl. No. | 882,004 |
| [22] | Filed | Dec. 4, 1969 |
| [45] | Patented | June 1, 1971 |

[54] METHOD AND APPARATUS FOR VORTICAL LIQUID-GAS MOVEMENT
7 Claims, 5 Drawing Figs.

[52] U.S. Cl. ................................................. 55/89,
55/92, 55/239, 98/115K, 261/79A
[51] Int. Cl. ...................................................... B01d 47/02
[50] Field of Search............................................ 98/115;
55/KH, 89, 92, 230, 225—239, 244, 249, 247,
257, 468; 261/119, 79.1

[56] References Cited
UNITED STATES PATENTS

| 1,062,446 | 5/1913 | Erust | 55/230 |
| 2,483,588 | 10/1949 | Mallory | 261/119 |
| 3,064,956 | 11/1962 | Reed | 261/124 |
| 3,248,858 | 5/1966 | Toke | 55/KH |
| 3,324,629 | 6/1967 | Graswich et al. | 55/229 |
| 3,348,830 | 10/1967 | Pearl et al. | 55/230 |
| 3,393,497 | 7/1968 | Donnelly | 55/KH |
| 3,406,498 | 10/1968 | Wisting | 55/227 |
| 3,488,924 | 1/1970 | Reeve | 55/92 |

Primary Examiner—Frank W. Lutter
Assistant Examiner—Bernard Nozick
Attorney—Melville, Strasser, Foster & Hoffman ABSTRACT: A method and apparatus for atomizing and elevating liquids with entrainment of gases therewith, which comprises generating an upwardly spiralling vortex within an elongated substantially vertical duct having an orifice at the top and a nonhorizontal configuration at the bottom defining a bottom orifice, at least a portion of the bottom of the duct being submerged in a reservoir of the liquid. Application of subatmospheric pressure to the interior of the duct results in atomization and elevation of the liquid within the confines of the bottom orifice, optional entrainment of gases therewith and vortical upward movement thereof. The reservoir is maintained at a level such as to keep at least a portion of the bottom of the duct submerged in the liquid.

PATENTED JUN 1 1971

INVENTOR/S
FRANK M. DONNELLY

BY *Melville, Strasser, Foster and Hoffman*
ATTORNEYS

INVENTOR/S
FRANK M. DONNELLY

METHOD AND APPARATUS FOR VORTICAL LIQUID-GAS MOVEMENT

BACKGROUND OF THE INVENTION

1. Field of the Invention

This invention relates to a method and apparatus for vortical atomization and elevation of liquids, usually in admixture with gases which, although not so limited, has particular utility in the fields of air cleaning, humidification of air, evaporative cooling of air, chemical processes wherein gases and liquids are mixed, and scrubbing of process gases with liquids.

2. Description of the Prior Art

The conventional approach to the problem of atomization and elevation of liquids has been to impart energy initially to a cohesive body or column of the liquid at rest and to move the liquid to another location before atomizing it and mixing it with gases. Such an approach involves the use of pumps, air compressors, rotating or stationary agglomeration baffles, Bernoulli tubes, spray nozzles, water wheels, or the like, in addition to exhaust fans to move the gases. The operational problems and substantial expense of such equipment are well known and constitute serious disadvantages in prior art systems.

U.S. Pat. No. 3,324,629, issued June 13, 1967 to E. Graswich et al., discloses a system for extracting volatilized grease and vapors from a cooking surface in a commercial kitchen, wherein a supply of detergent solution is pumped to a spray nozzle, the gases are passed through a spray of the solution and thereafter passed through rotating agglomeration baffles to impart some degree of centrifugal movement thereto. The centrifugal action is stated to remove the grease and detergent as a foam which is collected and drained.

U.S. Pat. No. 3,393,497, issued July 23, 1968 to the present applicant, discloses a fan wheel which produces a projected vortex within a duct or like enclosure. A centrifugal extractor is also disclosed and claimed which under certain conditions of operation projects a vortex. The two vortical effects, one created by a rotating member and the other by a stationary member, reinforce each other and result in a centrifugal action of substantial magnitude which condenses and agglomerates vaporized contaminants in the gases.

The Graswich et al. structure typifies prior art systems which require pumps to deliver liquid under pressure to spray nozzles where the liquid is atomized and dispersed through a gas stream. The provision of such elements and the further provision of a rotating agglomeration baffle illustrate the multiplicity and complexity of elements, and the attendant problems of operation and maintenance, in the conventional approach to atomization and elevation of liquids and to the mixing thereof with gases.

SUMMARY

The present invention constitutes a departure from the prior art systems which eliminates the problems inherent therein and provides a method of atomizing and elevating liquids applicable to a wide variety of uses.

According to the invention a vortex is generated within an elongated enclosure of sufficient magnitude to achieve a desired length of projection and transfer of energy, under conditions of subatmospheric pressure. The enclosure has an orifice at the top and bottom thereof, and the lower end of the enclosure has a nonhorizontal configuration so that at least a portion thereof penetrates the surface of the liquid to be atomized and elevated. As a consequence the full force of the vortex is projected into contact with the surface of the liquid so that a violent surface agitation is caused to occur which results in a high degree of agitation within the confines of the enclosure, elevation of large quantities of atomized liquid upwardly through the enclosure and thorough mixing in transit with gases which may be present.

The most significant feature of the present invention is the ability of the apparatus to function as a sump pump and to melt ice which may form within the confines of the elongated enclosure. Where the liquid to be atomized and elevated is contained in an outdoor reservoir or sump, surface water drainage or leakage may raise the level therein during periods of inoperation, and the water may freeze during winter months. Even when the water level has risen to a point above the orifice in the bottom of the enclosure greater than the suction capacity of the fan, the vortex generated under such conditions is of such magnitude and energy that the water is atomized and elevated, and the level is rapidly lowered to a point where only the lowermost portion of the enclosure is submerged. When the water has frozen in addition, the vortex projects its energy onto the surface of the ice, causing it to melt, whereupon the pumping action on the water is effected. For example, if the suction of the fan is such as to create a reduction of 4 inches in the height of a barometric column of water (generally expressed as 4 inch blocked tight suction), and the level of the water is 8 inches above the highest portion of the nonhorizontal orifice in the bottom of the enclosure, the vortex will rapidly atomize and elevate the water down to a level where only the lowermost portion of the enclosure remains submerged. It will of course be understood that no gases (other than those present inside the enclosure) are being drawn in and exhausted during the time that the highest portion of the nonhorizontal orifice is submerged in water. In other words, the apparatus is elevating only liquid under such conditions and hence functions as a pump. In its broadest aspect this invention thus involves the atomization and elevation of liquid by means of a projected vortex to heights substantially above that of a barometric column of the same liquid subjected to the same subatmospheric pressure.

In contrast to this, in louvre type collectors of the prior art having baffles extending beneath the surface of water under which air is drawn to create a mist, the depth to which the baffles may extend beneath the surface cannot exceed the blocked tight suction of the fan.

In a preferred embodiment the apparatus of the invention utilizes a fan wheel of the type disclosed in the above-mentioned Donnelly U.S. Pat. No. 3,393,497, which generates and projects a vortex downwardly into a depending enclosure or duct. It will be understood that in a conventional air moving device a vortex is undesirable, and means such as straightener vanes are provided to break up a vortex (if one is created) and increase the efficiency of the device by converting its rotational energy to a linear vector. In the present invention the opposite effect is required, and means for generating a vortex are thus necessary.

In order to achieve a vortex of the desired length of projection and transfer of energy, the rotational velocity of the outer sleeve of the vortex should be a minimum of 2,000 feet per minute, while the maximum may be about 12,000 feet per minute. A preferred rotational velocity is about 6,000 feet per minute. When gases are being treated, the linear (upward) velocity of the gases within the enclosure or duct should be a minimum of 1,000 feet per minute. A preferred linear velocity is about 2,000 feet per minute. Within the above operating ranges it has further been found that the ratio between the rotational velocity and linear velocity should not be less than 1:1, and the most effective ratio is 3:1.

Although not wishing to be bound by theory, it is believed that the circular motion of the vortex, when confined within the elongated enclosure, results in compression of gas in the outer sleeve of the vortex with consequent increase in density of the gas in the outer sleeve. This in turn decreases the density and pressure in the center of the vortex. The greater density of the outer sleeve transmits kinetic energy to the surface of the liquid in the enclosure and breaks it up into droplets which come under the influence of the subatmospheric pressure in the center of the vortex. A pressure gradient thus exists across the vortex, and probably a helical downward flow is established in the higher density outer sleeve with an axial upward counterflow in the lower density (and pressure) central portion of the vortex.

The configuration of the lower end of the enclosure or duct should be nonhorizontal, and the angle between the lower edge of the enclosure and the point of contact with the surface of the liquid is from 15° to 75° with the horizontal. A preferred angle is 55°.

The linear projection of the blades of the fan wheel into the top orifice of the duct (measured from the tips inwardly should range from 24 percent up to 100 percent, dependent to some extent upon the type of fan wheel used. With a fan wheel of the type disclosed in the above-mentioned Donnelly U.S. Pat. No. 3,393,497 a projection of 45 percent is the most efficient.

When operating within the preferred limits, the apparatus of the invention projects a vortex and elevates liquid at least 10 times the height of a barometric column of the liquid subjected to the same subatmospheric pressure.

BRIEF DESCRIPTION OF THE DRAWING

Reference is made to the accompanying drawing wherein.

DESCRIPTION OF THE PREFERRED EMBODIMENTS

Figure 1:
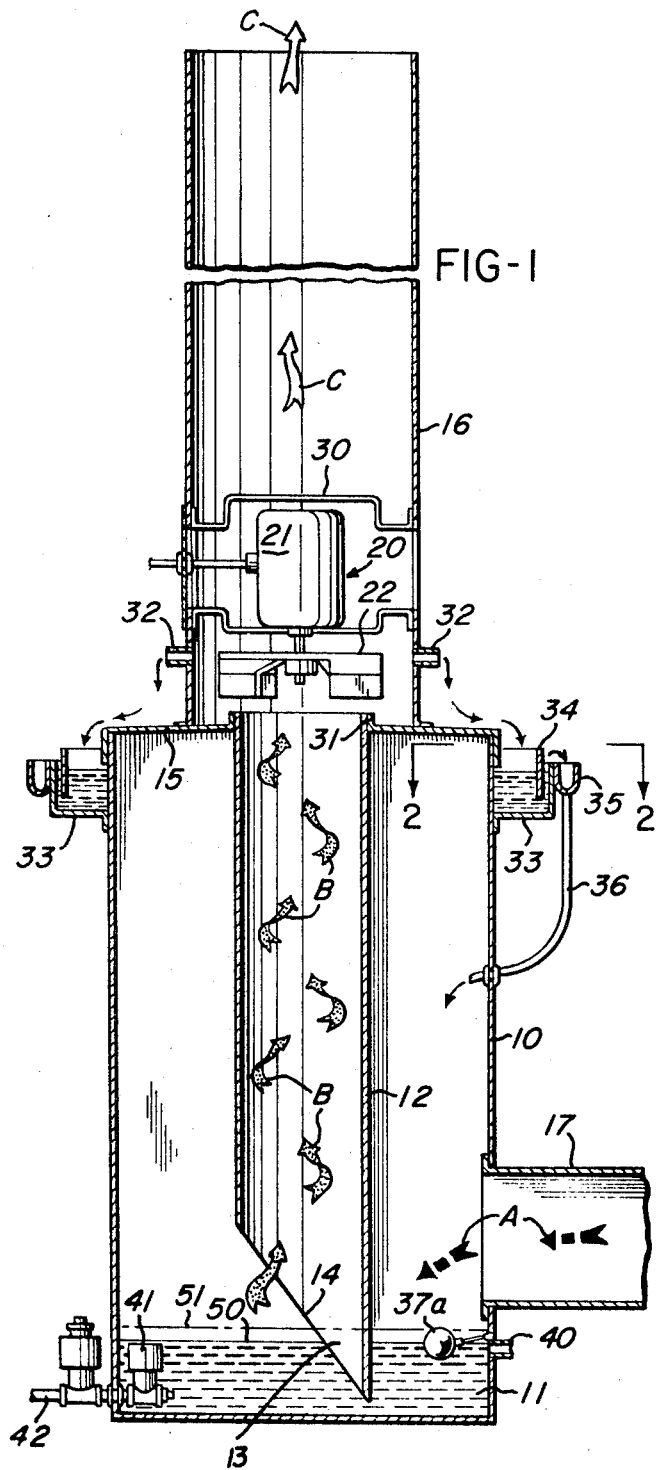
FIG. 1 is a vertical sectional view of a preferred embodiment of the apparatus of the invention.

Referring to FIG. 1 of the drawings, a tank or sump, which may be of circular or square cross-sectional configuration, is indicated at 10, in which is maintained a reservoir or pool of liquid 11, which will ordinarily be water. A downwardly depending, substantially vertical enclosure of duct 12, which may be of circular or square cross-sectional configuration, is secured substantially centrally of the sump 10 in such manner that at least a portion 13 of the lower end of the duct is submerged in the reservoir of liquid 11. In the embodiment of FIG. 1 the duct 12 is cut on a diagonal line 14 defining an orifice which by reason by the penetration of the lowermost portion 13 of the duct into the liquid 11 is only partly open to atmosphere.

Figure 3:
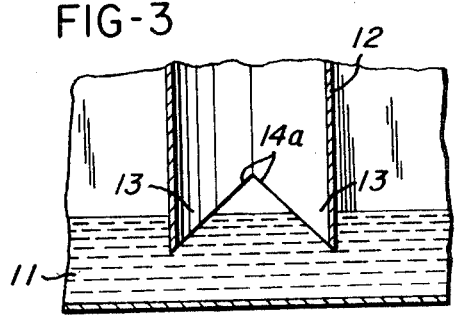
FIGS. 3, 4 and 5 are fragmentary vertical sectional views illustrating alternative modifications of a part of the apparatus of FIG. 1.
Figure 4:
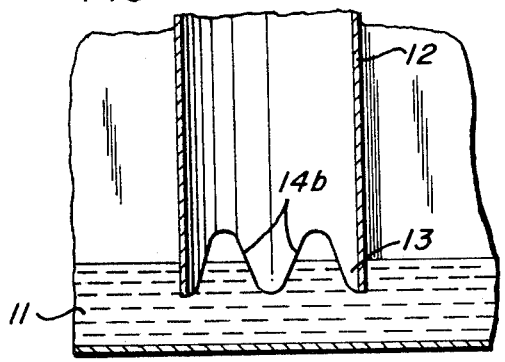
Figure 5:
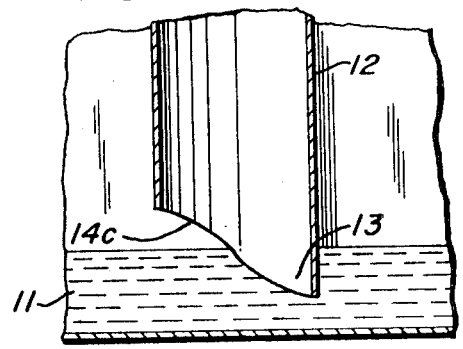

Alternative exemplary configurations of the lower end of the duct 12 are illustrated at 14a of FIG. 3, 14b of FIG. 4 and 14c of FIG. 5, all of which nonhorizontal configurations have the effect of defining an orifice, only part of which is open to atmosphere, and providing at least a portion 13 submerged in the pool of liquid 11.

Referring again to FIG. 1 of the drawing, the elongated duct 12 terminates in an upper orifice, at which point it is secured in depending relation from a closure member 15 which seals the interior of the sump 10 from outside atmosphere. The manner in which duct 12 is secured centrally of the closure member 15 does not constitute a limitation on the invention so long as a substantially gastight seal exists between duct 12 and closure member 15.

A stack 16 is mounted in coaxial alignment above the duct 12 and supported on closure member 15. Here again the stack 16 should have a connection with closure member 15 which will preclude entrance of outside atmosphere at the pressures involved within the sump 10, duct 12 and stack 16.

An inlet 17 into sump 10 is provided, preferably spaced a short distance above the level of the pool of liquid 11 through which gases which are to be mixed with and entrained with the liquid are admitted. As indicated previously, such gases could include, without limitation, air containing volatile contaminants which are to be condensed by or dissolved in water, air which is to be humidified, air which is to be cooled by evaporation of water, or chemical process gases wherein the gases and atomized liquids are to be intimately admixed.

A fan is indicated generally at 20 having a motor encased in a housing, as shown at 21. As shown in FIG. 1, a fan wheel 22 is mounted on the shaft of the fan 20, the fan wheel being of the type disclosed in the above-mentioned Donnelly U.S. Pat. No. 3,393,497. Since the fan wheel is described in detail in that patent and since it does not form a part of the present invention, a detailed description thereof is unnecessary here except to point out that each blade has a section shaped in the form of a propeller blade and a section which functions in the manner of a backwardly inclined centrifugal blower blade. Hence the fan wheel 22 generates both a vortex and a linear flow of gas. Other fan wheels functioning in an equivalent manner may be substituted.

An opening is preferably provided in the stack 16 communicating with an enclosure 30 within which the motor and housing 21 are positioned, for admission of cooling air to the motor.

A preferred means for collecting agglomerated liquid, returning it to the reservoir 11 and maintaining the level of the reservoir 11 at the desired depth is illustrated in FIG. 1. As there shown, gases admitted through inlet 17 pass around the duct 12 and enter the orifice where they are subjected to the vortex projected by fan wheel 22 under subatmospheric pressure. The vortex also impinges on the surface of the liquid reservoir 11 within the confines of the duct 12 causing violent agitation of the surface of the liquid and atomization thereof. The gas and atomized liquid are elevated within duct 12 in an upwardly spiralling vortex of considerable magnitude wherein thorough mixing occurs. Upon reaching the fan wheel, the rotating blades reatomize any liquid which may have agglomerated and throw it outwardly against the sidewalls of the stack 16. Thus the period of mixing dwell is extended since it includes both the length of time required to spiral upwardly within the duct and the length of time it is exposed to the action of the fan wheel. Upon contact with the sides of the stack 16 the liquid again agglomerates and collects on the surface of closure member 15 around the top orifice of duct 12. Preferably an upward flange 31 is provided around duct 12 in order to collect the agglomerated liquid and prevent its running back into the duct where it might be reentrained. A plurality of openings 32 is provided in the sides of the stack 16 (which may be positioned as high as the top plane of the fan wheel 22) through which agglomerated liquid runs out over the top surface of closure member 15. The action of the fan wheel is such as to cause positive pressure throughout the stack 16, thereby assisting in discharge of the agglomerated liquid. The liquid is then collected in a trough 33 which may extend partially or entirely around the periphery of the closure member 15. A skimmer for grease or other contaminants lighter than water may be provided, as indicated at 34. A further overflow trough 35 is provided extending at least partially around the periphery of trough 33, and at least one tube 36 is provided to conduct the liquid from trough 35 back into the pool or reservoir 11 in sump 10, or to discharge the liquid to waste.

Figure 2:
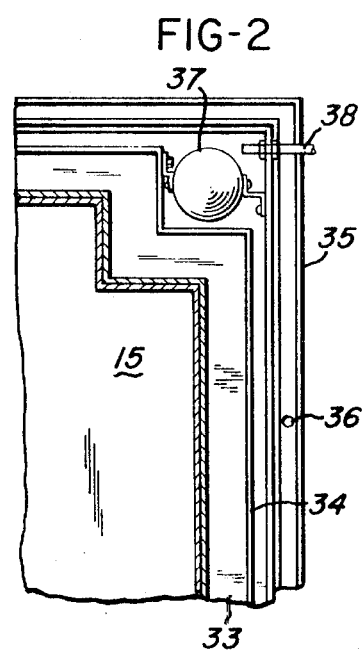
FIG. 2 is a fragmentary sectional view taken on the line 2-2 of FIG. 1.

As shown in FIG. 2, a float valve 37 of conventional type is provided in the trough 33 in order to control the level therein and thereby to control the rate of flow into overflow trough 35, thus indirectly maintaining the level of liquid in the pool 11. An inlet line 38 for introduction of makeup liquid is also provided which discharges into trough 33 adjacent float valve 37 and is controlled thereby in conventional manner.

In the event that the contaminated gases entering sump 10 through inlet 17 contain volatilized grease or vapors of other materials lighter than water, as in the case of a ventilating system for a commercial kitchen, a skimmer drain with an external discharge may be provided for removal of that portion of the grease which will condense upon coming in contact with the pool of water 11. A skimmer drain is shown at 41 in FIG. 1, connected to an external drain line 42.

In an arrangement which includes skimmer drain 41, the float valve 37 and inlet line 38 hereinabove described are omitted, and a float valve 37a is provided in the sump 10 which maintains the level of the pool 11 at the desired height relative to the skimmer drain 41. An inlet 40 for water is also provided, which is controlled by float valve 37a, for admission of makeup liquid when needed.

The flow pattern of the gases in the system is illustrated by the series of arrows in FIG. 1. Entering gases are designated by the arrows A before they have been contacted by the liquid in the reservoir 11. Admixed gases and atomized liquid are designated by arrows B in the upwardly spiralling vortex confined within duct 12 and subjected to the subatmospheric pressure generated by the fan wheel. Treated gases from which the liquid has been substantially removed by agglomeration are designated by arrows C moving upwardly in the stack 16.

It should further be understood that for some applications the provision of a sealed sump or tank such as that indicated at 10 in FIG. 1 is not necessary. For example, in the humidification or evaporative cooling of air, it is only necessary to provide a downwardly depending duct 12, at least a portion of which is submerged in an unconfined pool of water, and means for generating an upwardly spiralling vortex in communication with the upper orifice of the duct 12. The humidified or cooled air would then be passed through a stack or duct which surrounds the vortex generating means into the heating and/or cooling system of the house or building in which it is installed. On the other hand, where contaminated gases are being treated, or where chemical processes are being carried out, it is apparent that a sealed tank or sump of the type indicated at 10 in FIG. 1 would be needed.

In an exemplary installation, constructed in accordance with FIG. 1, for removal of grease vapors and other volatile contaminants in the ventilating system of a commercial kitchen, an outside sump is provided ranging in total height from 23 inches to 4½ feet and from 32 inches to 36 inches square. A downwardly depending duct which may be 14 inches in diameter is centrally mounted within the sump, the lower end of the duct being diagonally cut at an angle of 55° with the horizontal, with about 6 inches clearance between the lowermost end of the duct and the bottom of the sump. A stack of 24 inches to 30 inches diameter is mounted on the closure member of the sump, the lowermost section of the stack having a motor and fan installation therein. The motor may range between 3 and 7½ horsepower, depending upon the desired capacity, and the fan wheel may be 16 inches in diameter. In such an installation the blocked tight suction of the fan may be 4 inches, and the projected vortex is of sufficient magnitude to atomize and elevate water through at least 4 feet of duct and discharge it against the rotating fan wheel. The rotational velocity of the outer sleeve of the vortex is on the order of 6,000 feet per minute. About 5 gallons of water in atomized form is in circulation in such an installation. Upon shutdown, the water drains back into the sump and raises the level from that shown at 50 in FIG. 1 to that shown at 51 in FIG. 1. Upon restarting the system, the level is rapidly lowered back to the desired operating level shown at 50.

While the invention has been described in its preferred embodiments, it will be understood that numerous modifications may be made without departing from the spirit of the invention, and no limitations are to be inferred otherwise than as set forth in the claims which follow.

I claim:

1. A method of atomizing and elevating liquids and entraining gases therewith, comprising the steps of providing an elongated substantially cylindrical imperforate uniform diameter duct having orifices at the top and bottom thereof, the orifice at the lower end of said duct being nonhorizontal; providing fan means adjacent and above the top of said duct substantially coaxial with said top orifice for generating an upwardly spiraling vortex of gases within said duct under conditions of subatmospheric pressure with the rotational velocity of the outer rotating confines of said vortex being between 2,000 and 12,000 feet per minute; providing a reservoir of liquid below said duct; maintaining the surface of said liquid in said reservoir relative to said duct at a level such that the lowermost portion of said nonhorizontal bottom orifice is partially submerged in said liquid, the rotational velocity of said vortex being sufficient to cause the liquid at rest within the confines of said reservoir to be atomized and elevated in said vortex to a height substantially greater than that of a barometric column of the same liquid subjected to the same subatmospheric pressure, drawing gases into said duct through said nonhorizontal lower orifice and entraining same with said atomized liquid and elevated therewith; and separating liquid from the entrained mixture of liquid and gases after passage thereof upwardly through said top orifice.

2. The method of claim 1, wherein the linear velocity of said vortex is at least 1,000 feet per minute, and the ratio of rotational velocity to linear velocity is greater than 1:1.

3. The method of claim 1, wherein the step of separating liquid from said gases includes agglomerating said atomized liquid after passage through said duct, discharging said gases, and returning said separated liquid to said reservoir.

4. The method of claim 1, wherein the rotational velocity of the outer confines of said vortex is about 6,000 feet per minute, and wherein the ratio of rotational velocity to linear velocity is about 3:1.

5. Apparatus for atomizing and elevating liquids and entraining gases therewith, comprising an elongated substantially vertical and substantially cylindrical imperforate uniform diameter duct; orifices at the top and bottom of said duct; said bottom orifice having a nonhorizontal configuration; a reservoir containing a liquid beneath said duct; means for maintaining the surface of said liquid at a level, relative to said duct, such that a portion of said nonhorizontal bottom orifice is partially submerged in said liquid, the remaining portion of said bottom orifice not being submerged in said liquid providing substantially nonrestricted entry for gases into said duct above the surface of the liquid; fan means positioned closely above said top orifice substantially in axial alignment with said duct, said fan means generating an upwardly spiraling vortex of gases within said duct under conditions of subatmospheric pressure with the rotational velocity of the outer rotating confines of said vortex being between 2,000 and 12,000 feet per minute and of sufficient magnitude to rupture the surface tension of the liquid at rest within the confines of said duct, whereby said liquid is atomized and elevated in said vortex within said duct along with gases drawn through the nonsubmerged portion of said nonhorizontal bottom orifice; and means connected to the top of said duct for removing liquid from said gases after contact thereof with said fan means, a sump housing containing said reservoir including an inlet for gas thereabove, a top closure member for said sump, means securing said duct adjacent its top orifice to said closure member in sealing relation thereto, and an upwardly extending stack sealingly secured to said closure member, said fan means for generating an upwardly spiralling vortex being positioned in said stack in coaxial alignment with said top orifice.

6. The apparatus claimed in claim 5, wherein the bottom of said duct is cut on a diagonal of from 15° to 75° with the horizontal.

7. The apparatus claimed in claim 5, wherein said fan means comprises a motor and fan wheel positioned closely above said top orifice and substantially coaxial therewith, said fan wheel having blades at least a section of which directly above said top orifice function in the manner of backwardly inclined centrifugal blower blades.